United States Patent
Rossbach et al.

(10) Patent No.: US 8,041,833 B2
(45) Date of Patent: Oct. 18, 2011

(54) ELECTRONIC NETWORK FILTER FOR CLASSIFIED PARTITIONING

(75) Inventors: Dennis R. Rossbach, Corrales, NM (US); Michael A. Kvasnak, Bosque Farms, NM (US)

(73) Assignee: The Boeing Company, Chicago, IL (US)

( * ) Notice: Subject to any disclaimer, the term of this patent is extended or adjusted under 35 U.S.C. 154(b) by 3845 days.

(21) Appl. No.: 10/137,974

(22) Filed: May 3, 2002

(65) Prior Publication Data

US 2003/0208619 A1     Nov. 6, 2003

(51) Int. Cl.
*G06F 15/173* (2006.01)
(52) U.S. Cl. .................. 709/238; 709/203; 709/246
(58) Field of Classification Search ............... 709/238, 709/246, 203
See application file for complete search history.

(56) References Cited

U.S. PATENT DOCUMENTS 6,405,239 B1 *   6/2002   Addington et al. ........... 709/203

* cited by examiner

*Primary Examiner* — Tonia L. M. Dollinger
*Assistant Examiner* — Adnan Mirza
(74) *Attorney, Agent, or Firm* — Ostrager Chong Flaherty & Broitman P.C.

(57) ABSTRACT

An electronic network filter for classified partitioning in an ATM network. The filter has a classified network buffer for identifying whether data is classified or unclassified to define invalid and valid data packets. Invalid data packets are dropped from the classified network buffer and valid data packets are sent to an unclassified network for testing without interrupting the operation of the classified network. In one embodiment, the classified network buffer is programmable to adapt to the continually changing requirements of classified networks.

20 Claims, 3 Drawing Sheets

ELECTRONIC NETWORK FILTER FOR CLASSIFIED PARTITIONING

GOVERNMENT INTEREST

This invention was developed under a United States government contract, number F29601-91-C-001 and the government may have certain rights to this invention.

TECHNICAL FIELD

The present invention relates generally to an electronic network filter and more particularly to an electronic network filter for classified partitioning.

BACKGROUND OF THE INVENTION

The Broadband Integrated Services Digital Network (BISDN) is serviced by Asynchronous Transfer mode (ATM) switching networks and is used in a variety of applications, which apply to both classified and unclassified ATM networks. Some applications, such as testing of software developments, require the connection of networks having different classification levels. Current requirements for connecting networks having differing classifications, dictated by the National Industrial Security Program Operating Manual (formerly the Department of Defense Industrial Security Manual for Safeguarding Classified Information), include the need to re-certify security on the network for any software changes. However, the extensive testing required for a developmental test would interrupt the network service. Additionally, the testing procedure may compromise the security of a classified network. These are unacceptable consequences of testing software updates for classified networks.

There is a need for a secure method of changing and/or testing software changes on an electronic network, and particularly on a classified network that does not interfere with the operation of the network.

SUMMARY OF THE INVENTION

The present invention is an electronic network filter for classified partitioning that does not require multiple re-certification leads and tests that are typically required for program software changes in a classified network. The present invention places all controlled software at a single node of a high-speed ATM network in a firmware format. The single node is not externally addressable and therefore, it is impossible to modify without access to the internal components of the network, thereby maintaining tight security. In addition, the filter allows the ATM network to function at full speed with negligible group delay.

According to the present invention, a re-programmable filter, also called a Classified Network Buffer (CNB), is implemented on the ATM connection to an unclassified sub-network using a firmware filter on the ATM stream. A single node is established by the CNB. At this node, streaming data on the incoming ATM is examined for unclassified traffic and is passed to the output buffer and the remainder of the network. All other traffic is blocked. Incoming traffic, or unclassified network to classified network, is not modified unless desired.

It is an object of the present invention to allow all controlled software to be placed at a single node of a high-speed ATM. It is a further object of the present invention to maintain tight security without unnecessarily delaying the high-speed ATM network. It is still a further object of the present invention to allow the network to function at full speed with negligible group delay.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
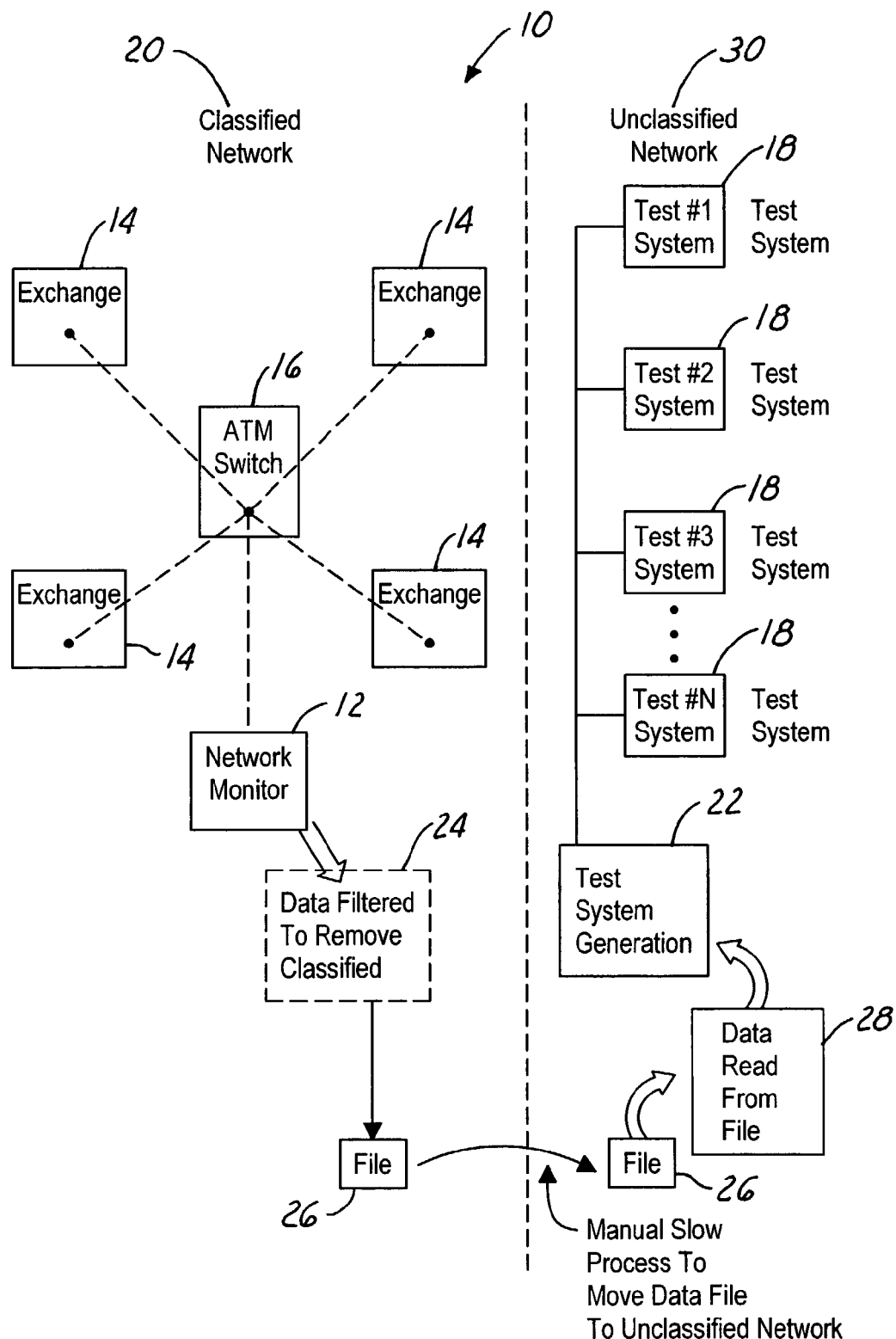
FIG. 1 is a block diagram of a prior art high-speed ATM network.

FIG. 1 is a block diagram of a prior art high-speed ATM network 10 having a classified network 20 and an unclassified network 30. The classified network 20 has a network monitor 12 and a plurality of exchanges 14 each connected to a central ATM switch 16 in the ATM network 10. The unclassified network 30 has a plurality of test systems 18 and a test data generation unit 22. The unclassified network 30 can have any number of test systems, 1 through N test systems are shown in FIG. 1.

When it becomes necessary to analyze data captured from the classified network 20 to the unclassified network 30, a data filter 24 removes classified data and isolates a desired data file 26. The file 26 is manually processed to move the data file from the classified network 20 to the unclassified network 30. Data 28 is read from the file 26 and transferred to the test generation unit 22.

This process is extremely involved and requires a lot of processing time. The process of manually moving a data file from the classified network to the unclassified network is unacceptable for frequent software changes. The process must be capable of re-certification of security on the network every time a software change is tested and implemented, without adversely affecting subscribers on the network. Furthermore, the data must be closely monitored to prevent classified data from inadvertently being passed to the unclassified network.

Figure 2:
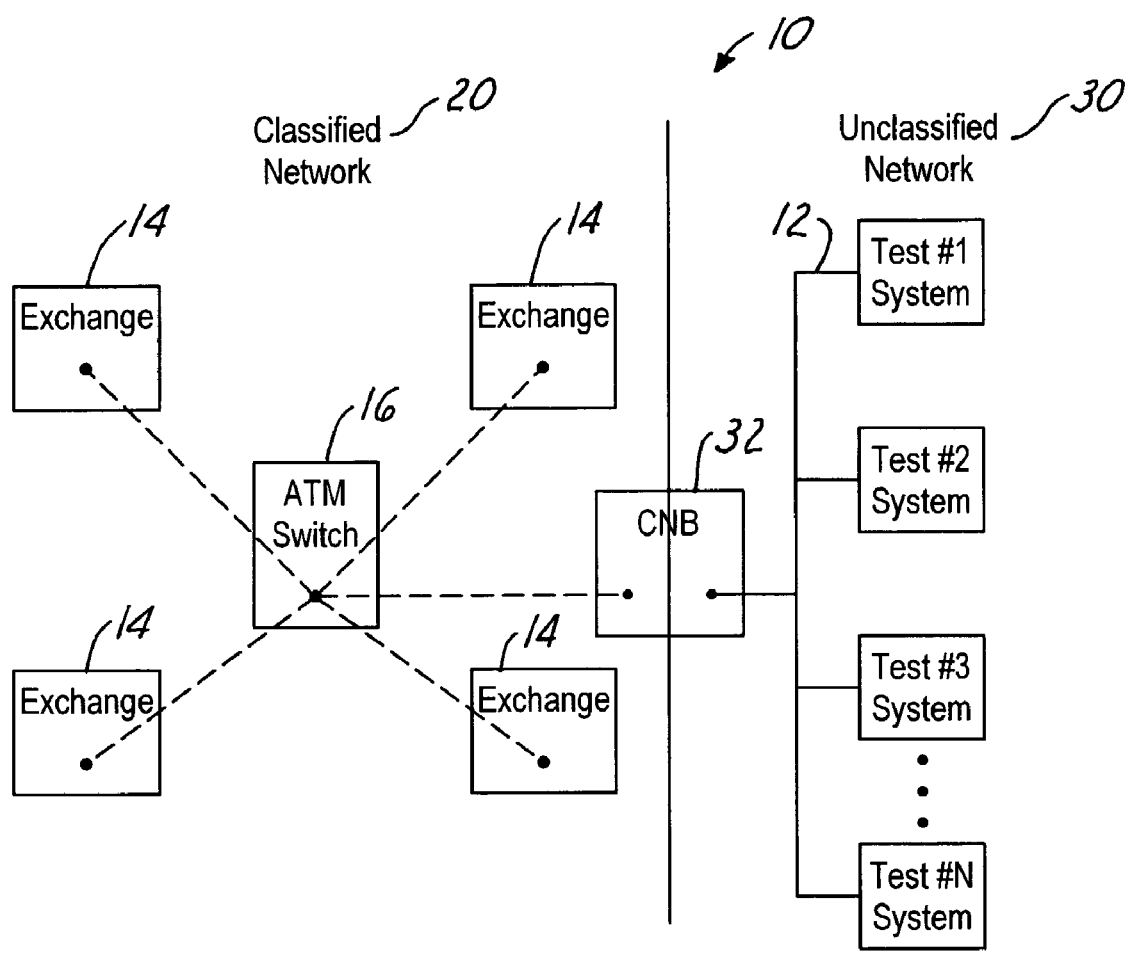
FIG. 2 is a block diagram of an ATM network having the filter of the present invention.

The present invention, shown in FIG. 2, has a classified network 20 having an ATM switch 16 connecting a plurality of exchanges 14. According to the present invention, a re-programmable filter or Classified Network Buffer (CNB) 32 filters ATM packets having unclassified data and places them in the unclassified network 30. The CNB 32 has hardware interfaces between the classified network 20 and the unclassified network 30 and has programmable firmware to perform the filter operations. This allows the CNB to be adjusted as needed for different applications without having to make significant hardware changes.

Figure 3:
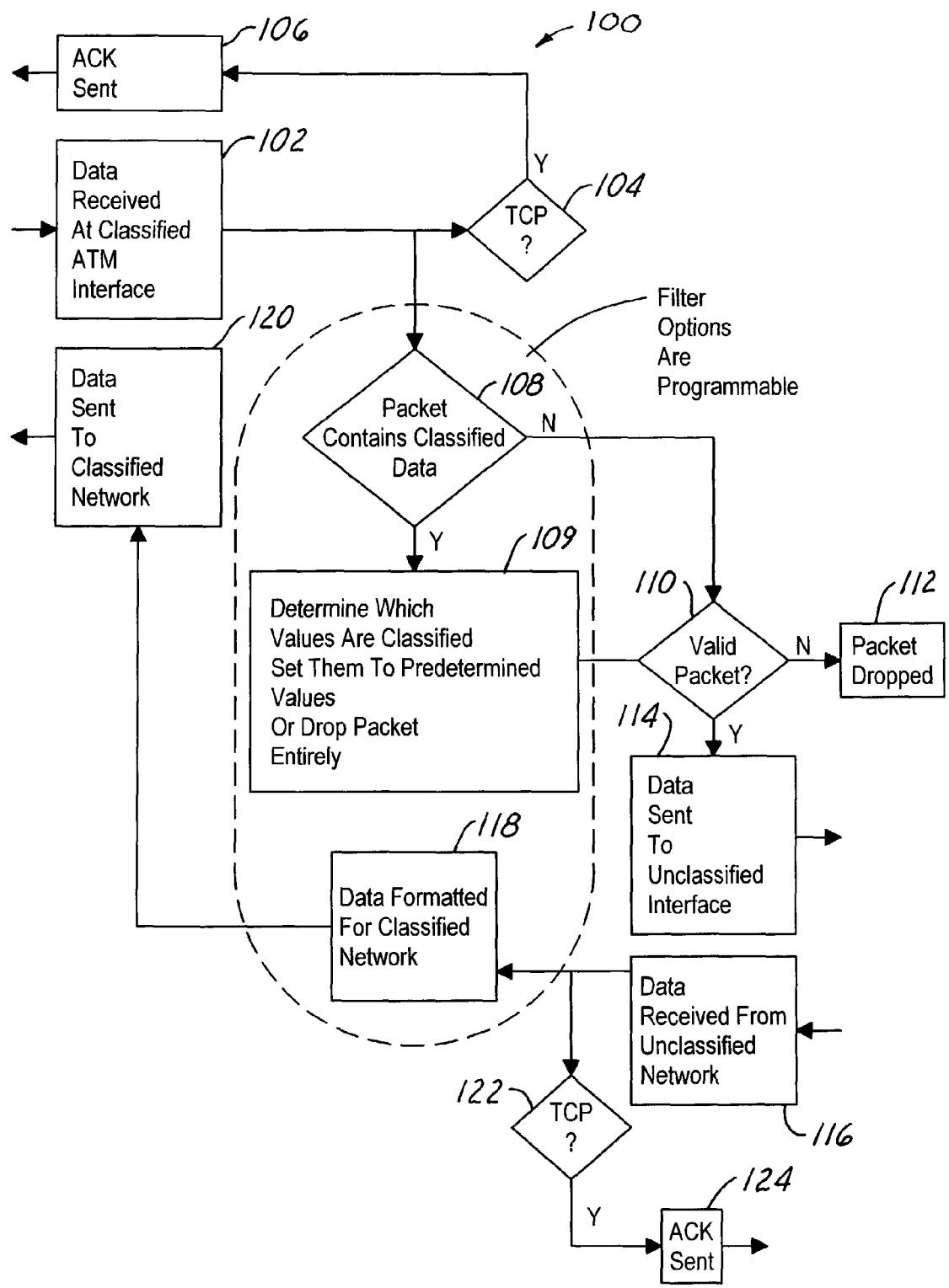
FIG. 3 is a flow chart of the method of the present invention.

Referring now to FIG. 3, the method 100 of the present invention will be described. The present invention is applicable to a User Datagram Protocol (UDP) system as well as a Transmission Control Protocol (TCP) system. In a UDP system an acknowledgement is not sent to the sender of the data. However, for a TCP system, an acknowledgment is sent to the sender. The flowchart of FIG. 3 is directed to both protocols.

From the standpoint of sending data from the classified network to the unclassified network, ATM packets are received 102 by the CNB. For a TCP system 104, an acknowledgement 106 is sent to the sender of the data. For either UDP or TCP, each ATM packet has a message identifier. These are examined 108 by the CNB to determined if the packet contains classified data. For example, the data is filtered for required sets of unclassified information destined for the unclassified sub-network. This aspect of the CNB is programmable firmware, which can be programmed for specific identifiers of classified data.

When the CNB determines the packet contains classified data, the CNB goes on to either drop the data packet entirely, or make a determination 109 of which values in the data are classified. This is done in any one of several methods known to those of ordinary skill in the art. For example, an algorithm may be used. An alternative to the algorithm method is a look-up table stored in memory in the CNB. The CNB filtering process is done at a high enough speed, i.e. in embedded processing, to pass acceptable packets to the unclassified sub-network, or dropping the entire message if it does not meet the clearance requirements.

A packet containing classified data, also called an invalid packet, is dropped entirely at this point. In the alternative, a packet having identified classified portions can be modified to disguise, or hide the classified portions before the packet is sent on to the unclassified network. A packet containing unclassified data, also called a valid packet, may be formatted before being sent on to the unclassified network. For example, an unclassified packet may be combined with other unclassified packets before being sent.

Once the CNB determines the packet's contents, a validity check 110 is done to ensure the ATM packet being sent is a valid packet. A valid packet contains only unclassified data and/or classified data that has been reformatted by the CNB. Invalid ATM packets are dropped 112 by the CNB. Valid and reformatted, ATM packets are sent to the unclassified network 114 through hardware interface.

Referring again to FIG. 2, the data sent to the unclassified network is tested by any number, N, of test systems. The advantage to the filter of the present invention is that the results of any tests performed in the unclassified network are sent and received in real time by the classified network.

Referring back to FIG. 3, once the tests are complete, data that is representative of the test results as well as control signals and system operational protocol information is sent 116 from the unclassified network back to the CNB. Again it should be noted that in the case of TCP 122, an acknowledgment 124 is sent to the sender of the data from the unclassified network.

For security purposes, the data sent from the unclassified network to the classified network is formatted 118 by programmable firmware in the CNB before being sent 120 to the classified network in real time. For simple systems, this format change may be merely changing network formats. For example, one solution would be to change from TCP packet format to UDP packet format. More complex systems would require more significant security monitoring. For example, on an airborne laser network, the formats and content ranges are controlled by an error-handling system for a ground segment, which ultimately renders the system non-functional should classified data be placed in an unclassified ATM packet.

The invention covers all alternatives, modifications, and equivalents, as may be included within the spirit and scope of the appended claims.

What is claimed is:

1. An electronic network filter for classified partitioning in an asynchronous transfer mode (ATM) network having an ATM switch in a classified sub-network and a plurality of test systems in an unclassified network, said electronic network filter comprising:
   a classified network buffer in communication with said ATM switch and each of said plurality of test systems for real time filtering of data packets being sent between said classified and unclassified networks.

2. The electronic network filter as claimed in claim 1 wherein said classified network buffer is programmable.

3. The electronic network filter as claimed in claim 2 wherein said programmable classified network buffer comprises:
   programmable hardware having a software program for determining whether a data content of each packet is classified and unclassified;
   for formatting classified data into a form that is sufficiently unclassified thereby defining a valid packet and dropping classified data packets from said classified network buffer thereby defining an invalid packet; and
   for sending said valid packet to said unclassified network.

4. The electronic network filter as claimed in claim 3 wherein said programmable hardware has a software program for verifying the validity of a valid packet before sending said valid packet to said unclassified network.

5. An electronic network filter for classified partitioning in an asynchronous transfer mode (ATM) network undergoing testing of software updates, the ATM network having an ATM switch in a classified sub-network and a plurality of test systems in an unclassified sub-network, and wherein the testing of software updates requires the transfer of data between the classified and unclassified sub-networks, said electronic network filter comprising:
   a classified network buffer in communication with said ATM switch and each of said plurality of test systems for sending and receiving data packets sent between said classified network and said unclassified network, said classified network buffer comprising;
   means for receiving data packet from said classified network;
   means for determining whether each received data packet contains classified data;
   means for filtering out received data packets containing undisguised classified data;
   means for determining whether each received data packet contains unclassified data;
   means for sending received data packets containing no undisguised classified data to said unclassified network for testing by at least one of said plurality of test systems;
   means for receiving test result data from said at least one test system representing a result of testing data in said received data packets; and
   means for sending said test result data to said classified network.

6. The electronic network filter as claimed in claim 5 wherein said classified network buffer is programmable.

7. The electronic network filter as claimed in claim 6 wherein said programmable classified network buffer further comprises programmable hardware and said means take the form of software for said programmable hardware.

8. The electronic network filter as claimed in claim 5 wherein said means for determining whether each received data packet contains classified data further comprises:
   means for identifying which data is classified; and means for formatting said classified data into unclassified data, thereby defining a valid packet.

9. A method for testing changes to a classified ATM network having a classified network buffer, said method comprising the following steps performed by said classified network buffer:
  receiving ATM packets sent from said classified network;
  determining whether each received ATM packet contains classified data;
  filtering out received ATM packets containing undisguised classified data;
  determining whether each received ATM packet contains unclassified data;
  sending received ATM packets containing no undisguised classified data to an unclassified network for testing by at least one of a plurality of test systems;
  receiving test result data from said at least one test system representing a result of testing data in said received data packets; and
  sending said test result data to said classified ATM network.

10. The method as claimed in claim 9 further comprising the steps of:
  sending an acknowledgement that data was sent from said classified network to said classified network buffer; and
  sending an acknowledgement that data was sent from said unclassified network to said classified network buffer.

11. The method as claimed in claim 9 wherein said step of determining whether received ATM packets contain classified data further comprises performing an algorithm for determining the data in the ATM packet contains classified data in a message header.

12. The method as claimed in claim 9 wherein said step of determining whether received ATM packets contain classified data further comprises referring to a look-up table containing values for comparison to a message header of said ATM packet.

13. The method as claimed in claim 9 wherein said step of determining whether received ATM packets contain classified data further comprises performing an algorithm for determining the data in the ATM packet contains classified data in a message identifier.

14. The method as claimed in claim 9 wherein said step of determining whether received ATM packets contain classified data further comprises referring to a look-up table containing values for comparison to a message identifier in said ATM packet.

15. The method as claimed in claim 9 further comprising the step of determining which data values in an invalid ATM packet are classified, said classified data values being dropped from said ATM packet thereby defining a valid ATM packet.

16. The method as claimed in claim 15 further comprising the step of using an algorithm to determine which values in said ATM packet are classified values.

17. The method as claimed in claim 16 further comprising the step of formatting classified data into unclassified data thereby defining a valid packet.

18. The method as claimed in claim 15 further comprising the step of using a look-up table to determine which values in said ATM packet are classified values.

19. The method as claimed in claim 18 further comprising the step of formatting classified data into unclassified data thereby defining a valid packet.

20. The method as claimed in claim 9 further comprising the step of formatting said test result data into a predetermined format before sending said data to said classified network.

* * * * *